United States Patent
Amidon et al.

(10) Patent No.: US 9,288,540 B2
(45) Date of Patent: Mar. 15, 2016

(54) SYSTEM AND METHOD FOR AGGREGATING DEVICES FOR INTUITIVE BROWSING

(75) Inventors: Christopher M. Amidon, Apex, NC (US); Scott Curtis, Durham, NC (US); Hugh Svendsen, Chapel Hill, NC (US)

(73) Assignee: ELOY TECHNOLOGY, LLC, Wilmington, DE (US)

(*) Notice: Subject to any disclaimer, the term of this patent is extended or adjusted under 35 U.S.C. 154(b) by 362 days.

(21) Appl. No.: 12/731,606

(22) Filed: Mar. 25, 2010

(65) Prior Publication Data

US 2012/0117471 A1  May 10, 2012

Related U.S. Application Data

(60) Provisional application No. 61/163,086, filed on Mar. 25, 2009.

(51) Int. Cl.
*G06F 3/01* (2006.01)
*H04N 21/462* (2011.01)
(Continued)

(52) U.S. Cl.
CPC ............ *H04N 21/4622* (2013.01); *H04N 5/76* (2013.01); *H04N 5/765* (2013.01); *H04N 5/782* (2013.01); *H04N 9/8205* (2013.01); *H04N 21/4263* (2013.01); *H04N 21/4312* (2013.01); *H04N 21/4334* (2013.01); *H04N 21/43615* (2013.01); *H04N 21/43622* (2013.01);
(Continued)

(58) Field of Classification Search
CPC .......... H04N 5/44543; H04N 21/4622; H04N 21/47; G11B 27/34; G11B 27/034
USPC .................................. 715/716, 838; 709/231
See application file for complete search history.

(56) References Cited

U.S. PATENT DOCUMENTS

| | | |
|---|---|---|
| 4,468,732 A | 8/1984 | Raver |
| 4,694,490 A | 9/1987 | Harvey et al. |

(Continued)

FOREIGN PATENT DOCUMENTS

| | | |
|---|---|---|
| CA | 2271552 A1 | 6/1994 |
| WO | 95/32583 A1 | 11/1995 |

(Continued)

OTHER PUBLICATIONS

Abstract, "Netscape Communicator: Introduction to Communicator," Version 4, Netscape Communications, 1997, at <http://www.amazon.com/Netscape-Communicator-Introduction-Version/dp/0151049750>, printed Jun. 25, 2012, 4 pages.

(Continued)

*Primary Examiner* — Jessica Chuang

(57) ABSTRACT

A media device includes a communication interface communicatively coupling the media device to one or more other media devices and a display, and a controller associated with the communication interface. The controller is adapted to access one or more templates comprising a layout of a graphical user interface (GUI). The controller further identifies one or more other media devices from which media content may be streamed and one or more media content streams available from each of the one or more media devices and determine, based upon the template and the one or more media content streams, at least one of the media content streams to display. The controller then acquires and outputs the at least one of the media content streams for display in accordance with the layout.

30 Claims, 7 Drawing Sheets

(51) Int. Cl.

| | |
|---|---|
| *H04N 21/431* | (2011.01) |
| *H04N 21/475* | (2011.01) |
| *H04N 5/76* | (2006.01) |
| *H04N 5/765* | (2006.01) |
| *H04N 5/782* | (2006.01) |
| *H04N 9/82* | (2006.01) |
| *H04N 21/426* | (2011.01) |
| *H04N 21/433* | (2011.01) |
| *H04N 21/436* | (2011.01) |
| *H04N 21/442* | (2011.01) |
| *H04N 21/458* | (2011.01) |
| *H04N 21/472* | (2011.01) |
| *H04N 21/6543* | (2011.01) |
| *H04N 21/658* | (2011.01) |
| *H04N 21/84* | (2011.01) |

(52) U.S. Cl.
CPC .... *H04N 21/44222* (2013.01); *H04N 21/4583* (2013.01); *H04N 21/4756* (2013.01); *H04N 21/47214* (2013.01); *H04N 21/6543* (2013.01); *H04N 21/6582* (2013.01); *H04N 21/84* (2013.01)

(56) References Cited

U.S. PATENT DOCUMENTS

| | | |
|---|---|---|
| 4,704,725 A | 11/1987 | Harvey et al. |
| 4,827,447 A | 5/1989 | Croes et al. |
| 4,956,774 A | 9/1990 | Shibamiya et al. |
| 4,965,825 A | 10/1990 | Harvey et al. |
| 5,109,414 A | 4/1992 | Harvey et al. |
| 5,115,501 A | 5/1992 | Kerr |
| 5,121,478 A | 6/1992 | Rao |
| 5,223,924 A | 6/1993 | Strubbe |
| 5,233,654 A | 8/1993 | Harvey et al. |
| 5,335,277 A | 8/1994 | Harvey et al. |
| 5,347,632 A | 9/1994 | Filepp et al. |
| 5,353,121 A | 10/1994 | Young et al. |
| 5,367,686 A | 11/1994 | Fisher et al. |
| 5,404,510 A | 4/1995 | Smith et al. |
| 5,412,808 A | 5/1995 | Bauer |
| 5,446,891 A | 8/1995 | Kaplan et al. |
| 5,526,034 A | 6/1996 | Hoarty et al. |
| 5,528,304 A | 6/1996 | Cherrick et al. |
| 5,530,852 A | 6/1996 | Meske, Jr. et al. |
| 5,550,576 A | 8/1996 | Klosterman |
| 5,579,055 A | 11/1996 | Hamilton et al. |
| 5,585,865 A | 12/1996 | Amano et al. |
| 5,587,734 A | 12/1996 | Lauder et al. |
| 5,592,660 A | 1/1997 | Yokota et al. |
| 5,594,507 A | 1/1997 | Hoarty |
| 5,594,509 A | 1/1997 | Florin et al. |
| 5,596,373 A | 1/1997 | White et al. |
| 5,598,536 A | 1/1997 | Slaughter, III et al. |
| 5,600,378 A | 2/1997 | Wasilewski |
| 5,630,119 A | 5/1997 | Aristides et al. |
| 5,652,613 A | 7/1997 | Lazarus et al. |
| 5,666,645 A | 9/1997 | Thomas et al. |
| 5,694,176 A | 12/1997 | Bruette et al. |
| 5,695,400 A | 12/1997 | Fennell, Jr. et al. |
| 5,696,897 A | 12/1997 | Dong |
| 5,701,451 A | 12/1997 | Rogers et al. |
| 5,710,884 A | 1/1998 | Dedrick |
| 5,712,129 A | 1/1998 | Ford |
| 5,712,979 A | 1/1998 | Graber et al. |
| 5,717,860 A | 2/1998 | Graber et al. |
| 5,719,786 A | 2/1998 | Nelson et al. |
| 5,727,129 A | 3/1998 | Barrett et al. |
| 5,737,599 A | 4/1998 | Rowe et al. |
| 5,754,938 A | 5/1998 | Herz et al. |
| 5,754,939 A | 5/1998 | Herz et al. |
| 5,758,257 A | 5/1998 | Herz et al. |
| 5,760,838 A | 6/1998 | Adams et al. |
| 5,761,662 A | 6/1998 | Dasan |
| 5,774,664 A | 6/1998 | Hidary et al. |
| 5,778,187 A | 7/1998 | Monteiro et al. |
| 5,784,058 A | 7/1998 | LaStrange et al. |
| 5,784,608 A | 7/1998 | Meske, Jr. et al. |
| 5,793,438 A | 8/1998 | Bedard |
| 5,801,747 A | 9/1998 | Bedard |
| 5,801,753 A | 9/1998 | Eyer et al. |
| 5,812,123 A | 9/1998 | Rowe et al. |
| 5,813,007 A | 9/1998 | Nielsen |
| 5,819,301 A | 10/1998 | Rowe et al. |
| 5,854,897 A | 12/1998 | Radziewicz et al. |
| 5,867,495 A | 2/1999 | Elliott et al. |
| 5,887,243 A | 3/1999 | Harvey et al. |
| 5,893,091 A | 4/1999 | Hunt et al. |
| 5,907,843 A | 5/1999 | Cleron et al. |
| 5,923,362 A | 7/1999 | Klosterman |
| 5,945,988 A | 8/1999 | Williams et al. |
| 5,948,040 A | 9/1999 | DeLorme et al. |
| 5,977,964 A | 11/1999 | Williams et al. |
| 5,986,656 A | 11/1999 | Crutcher et al. |
| 5,990,890 A | 11/1999 | Etheredge |
| 6,005,563 A | 12/1999 | White et al. |
| 6,034,683 A | 3/2000 | Mansour et al. |
| 6,072,486 A | 6/2000 | Sheldon et al. |
| 6,119,098 A | 9/2000 | Guyot et al. |
| 6,141,058 A | 10/2000 | Lagoni et al. |
| 6,311,175 B1 | 10/2001 | Adriaans et al. |
| 6,317,881 B1 | 11/2001 | Shah-Nazaroff et al. |
| 6,349,297 B1 | 2/2002 | Shaw et al. |
| 6,351,467 B1 | 2/2002 | Dillon |
| 6,388,714 B1 | 5/2002 | Schein et al. |
| 6,434,621 B1 | 8/2002 | Pezzillo et al. |
| 6,442,598 B1 | 8/2002 | Wright et al. |
| 6,459,427 B1 | 10/2002 | Mao et al. |
| 6,476,827 B1 | 11/2002 | Porter |
| 6,486,892 B1 | 11/2002 | Stern |
| 6,614,890 B2 | 9/2003 | Perlman et al. |
| 6,642,938 B1* | 11/2003 | Gilboy .......................... 715/721 |
| 6,647,389 B1 | 11/2003 | Fitch et al. |
| 6,694,316 B1* | 2/2004 | Langseth et al. |
| 6,724,431 B1* | 4/2004 | Aton .............................. 348/461 |
| 6,735,701 B1 | 5/2004 | Jacobson |
| 6,760,916 B2* | 7/2004 | Holtz et al. ...................... 725/34 |
| 6,772,433 B1 | 8/2004 | LaJoie et al. |
| 6,823,344 B1 | 11/2004 | Isensee et al. |
| 6,986,154 B1 | 1/2006 | Price et al. |
| 7,096,486 B1 | 8/2006 | Ukai et al. |
| 7,149,511 B1 | 12/2006 | Bachner, III et al. |
| 7,185,355 B1 | 2/2007 | Ellis et al. |
| 7,197,713 B2 | 3/2007 | Stern |
| 7,222,163 B1* | 5/2007 | Girouard et al. .............. 709/219 |
| 7,296,295 B2* | 11/2007 | Kellerman et al. ............. 726/26 |
| 7,356,547 B2* | 4/2008 | Ozer et al. .......................... 1/1 |
| 7,373,650 B1 | 5/2008 | Rodriguez et al. |
| 7,395,514 B2 | 7/2008 | Stern |
| 7,454,777 B1 | 11/2008 | Nishikawa et al. |
| 7,493,312 B2* | 2/2009 | Liu et al. ............................ 1/1 |
| 7,503,055 B2* | 3/2009 | Reynolds et al. ................ 725/32 |
| 7,571,452 B2 | 8/2009 | Gutta |
| 7,634,466 B2 | 12/2009 | Rose et al. |
| 7,673,327 B1* | 3/2010 | Polis et al. ......................... 726/5 |
| 7,689,510 B2* | 3/2010 | Lamkin et al. ................... 705/51 |
| 7,752,265 B2* | 7/2010 | Svendsen et al. ............. 709/205 |
| 7,779,097 B2* | 8/2010 | Lamkin et al. ................ 709/223 |
| 7,849,486 B2 | 12/2010 | Russ et al. |
| 7,895,625 B1 | 2/2011 | Bryan et al. |
| 7,925,723 B1* | 4/2011 | Amidon et al. ............... 709/220 |
| 7,958,457 B1* | 6/2011 | Brandenberg et al. ......... 715/789 |
| 7,966,382 B2* | 6/2011 | Ahluwalia et al. ............ 709/218 |
| 7,987,490 B2* | 7/2011 | Ansari et al. .................... 725/82 |
| 7,991,019 B2* | 8/2011 | Thomas ......................... 370/537 |
| 8,042,132 B2* | 10/2011 | Carney et al. ................... 725/37 |
| 8,046,411 B2* | 10/2011 | Hayashi et al. ............... 709/204 |
| 8,046,697 B2 | 10/2011 | Stern |
| 8,271,549 B2* | 9/2012 | Klein et al. .................... 707/813 |
| 8,302,127 B2* | 10/2012 | Klarfeld et al. .................. 725/46 |
| 8,312,494 B2* | 11/2012 | Collet et al. ..................... 725/97 |
| 8,316,394 B2* | 11/2012 | Yates ................................ 725/39 |

(56) References Cited

U.S. PATENT DOCUMENTS

| | | | |
|---|---|---|---|
| 8,352,978 B2* | 1/2013 | Reynolds et al. | 725/25 |
| 8,365,230 B2* | 1/2013 | Chane et al. | 725/59 |
| 8,370,396 B2* | 2/2013 | Blaxland et al. | 707/800 |
| 8,375,068 B1* | 2/2013 | Platt et al. | 707/805 |
| 8,386,513 B2* | 2/2013 | Victor et al. | 707/772 |
| 8,452,885 B2* | 5/2013 | Sherer et al. | 709/231 |
| 8,458,153 B2* | 6/2013 | Pierce | 707/705 |
| 8,479,225 B2* | 7/2013 | Covell et al. | 725/18 |
| 8,510,779 B2* | 8/2013 | Slothouber et al. | 725/51 |
| 8,539,357 B2* | 9/2013 | Hildreth | 715/745 |
| 8,548,978 B2* | 10/2013 | Lynn et al. | 707/710 |
| 8,601,515 B2* | 12/2013 | Sparrell | 725/58 |
| 8,607,287 B2* | 12/2013 | Walker | 725/95 |
| 2001/0023401 A1 | 9/2001 | Weishut et al. | |
| 2002/0038387 A1 | 3/2002 | Fuiks et al. | |
| 2002/0053078 A1* | 5/2002 | Holtz et al. | 725/14 |
| 2002/0053081 A1 | 5/2002 | Griggs | |
| 2002/0059604 A1* | 5/2002 | Papagan | H04N 21/23412 725/51 |
| 2002/0112244 A1* | 8/2002 | Liou et al. | 725/93 |
| 2002/0166123 A1* | 11/2002 | Schrader et al. | 725/58 |
| 2002/0174428 A1 | 11/2002 | Agnihotri et al. | |
| 2002/0175931 A1* | 11/2002 | Holtz et al. | 345/716 |
| 2002/0186233 A1* | 12/2002 | Holtz et al. | 345/716 |
| 2003/0018972 A1* | 1/2003 | Arora | 725/47 |
| 2003/0038840 A1 | 2/2003 | Stern | |
| 2003/0048299 A1 | 3/2003 | Stern | |
| 2003/0048808 A1* | 3/2003 | Stahl et al. | 370/487 |
| 2003/0051246 A1 | 3/2003 | Wilder et al. | |
| 2003/0052916 A1 | 3/2003 | Stern | |
| 2003/0067554 A1* | 4/2003 | Klarfeld et al. | 348/461 |
| 2003/0084449 A1* | 5/2003 | Chane et al. | 725/46 |
| 2003/0084452 A1* | 5/2003 | Ryan et al. | 725/51 |
| 2003/0088410 A1 | 5/2003 | Geidl et al. | |
| 2003/0093793 A1 | 5/2003 | Gutta | |
| 2003/0184598 A1* | 10/2003 | Graham | 345/838 |
| 2003/0200336 A1* | 10/2003 | Pal et al. | 709/246 |
| 2003/0237093 A1 | 12/2003 | Marsh | |
| 2004/0003393 A1 | 1/2004 | Gutta et al. | |
| 2004/0003400 A1* | 1/2004 | Carney et al. | 725/42 |
| 2004/0025180 A1* | 2/2004 | Begeja et al. | 725/46 |
| 2004/0049787 A1 | 3/2004 | Maissel et al. | |
| 2004/0060061 A1 | 3/2004 | Parker | |
| 2004/0068739 A1 | 4/2004 | Russ et al. | |
| 2004/0078807 A1 | 4/2004 | Fries et al. | |
| 2004/0078814 A1* | 4/2004 | Allen | 725/47 |
| 2004/0117820 A1* | 6/2004 | Thiemann et al. | 725/37 |
| 2004/0131336 A1* | 7/2004 | Matsuno et al. | 386/95 |
| 2004/0168189 A1* | 8/2004 | Reynolds et al. | 725/42 |
| 2004/0220925 A1* | 11/2004 | Liu et al. | 707/3 |
| 2004/0221308 A1* | 11/2004 | Cuttner et al. | 725/46 |
| 2004/0268403 A1* | 12/2004 | Krieger et al. | 725/112 |
| 2005/0022241 A1 | 1/2005 | Griggs | |
| 2005/0138111 A1* | 6/2005 | Aton et al. | 709/201 |
| 2005/0138656 A1* | 6/2005 | Moore et al. | 725/45 |
| 2005/0138658 A1 | 6/2005 | Bryan | |
| 2005/0149987 A1 | 7/2005 | Boccon-Gibod et al. | |
| 2005/0155052 A1 | 7/2005 | Ostrowska et al. | |
| 2005/0183110 A1 | 8/2005 | Anderson | |
| 2005/0187895 A1* | 8/2005 | Paya et al. | 707/1 |
| 2005/0193015 A1 | 9/2005 | Logston et al. | |
| 2005/0237699 A1* | 10/2005 | Carroll | 361/600 |
| 2005/0251822 A1 | 11/2005 | Knowles et al. | |
| 2005/0251827 A1 | 11/2005 | Ellis et al. | |
| 2005/0283791 A1* | 12/2005 | McCarthy et al. | 725/1 |
| 2006/0020973 A1 | 1/2006 | Hannum et al. | |
| 2006/0031203 A1 | 2/2006 | Rosenbaum et al. | |
| 2006/0035610 A1 | 2/2006 | Potrebic | |
| 2006/0053470 A1* | 3/2006 | Colter et al. | 725/135 |
| 2006/0106874 A1* | 5/2006 | Victor et al. | 707/104.1 |
| 2006/0117354 A1 | 6/2006 | Schutte et al. | |
| 2006/0150214 A1 | 7/2006 | Ramraz et al. | |
| 2006/0159109 A1* | 7/2006 | Lamkin et al. | 370/401 |
| 2006/0161635 A1* | 7/2006 | Lamkin et al. | 709/217 |
| 2006/0161953 A1 | 7/2006 | Walter et al. | |
| 2006/0168126 A1 | 7/2006 | Costa-Requena et al. | |
| 2006/0168219 A1* | 7/2006 | Ahluwalia et al. | 709/225 |
| 2006/0200575 A1* | 9/2006 | Sherer et al. | 709/231 |
| 2006/0212906 A1* | 9/2006 | Cantalini | 725/62 |
| 2006/0218581 A1 | 9/2006 | Ostrowska et al. | |
| 2006/0253417 A1 | 11/2006 | Brownrigg et al. | |
| 2006/0259926 A1 | 11/2006 | Scheelke et al. | |
| 2006/0271997 A1* | 11/2006 | Jacoby et al. | 725/135 |
| 2006/0282851 A1 | 12/2006 | Errico et al. | |
| 2006/0282852 A1 | 12/2006 | Purpura et al. | |
| 2007/0011702 A1* | 1/2007 | Vaysman | 725/45 |
| 2007/0033612 A1* | 2/2007 | Lerman et al. | 725/39 |
| 2007/0058924 A1 | 3/2007 | Yeh | |
| 2007/0073728 A1* | 3/2007 | Klein et al. | 707/10 |
| 2007/0101368 A1 | 5/2007 | Jacoby et al. | |
| 2007/0112935 A1 | 5/2007 | Espelien | |
| 2007/0130521 A1* | 6/2007 | Gonzalez et al. | 715/733 |
| 2007/0143128 A1 | 6/2007 | Tokarev et al. | |
| 2007/0143260 A1 | 6/2007 | Markov et al. | |
| 2007/0157237 A1* | 7/2007 | Cordray et al. | 725/42 |
| 2007/0157281 A1* | 7/2007 | Ellis et al. | 725/134 |
| 2007/0169148 A1 | 7/2007 | Oddo et al. | |
| 2007/0196806 A1* | 8/2007 | Ljungman | G09B 3/00 434/350 |
| 2007/0220566 A1* | 9/2007 | Ahmad-Taylor | 725/89 |
| 2007/0250896 A1 | 10/2007 | Parker et al. | |
| 2007/0255785 A1* | 11/2007 | Hayashi et al. | 709/204 |
| 2007/0288960 A1 | 12/2007 | Akiyama | |
| 2007/0294249 A1 | 12/2007 | Feyaerts | |
| 2008/0034043 A1 | 2/2008 | Gandhi et al. | |
| 2008/0062318 A1* | 3/2008 | Ellis et al. | 348/564 |
| 2008/0069120 A1* | 3/2008 | Thomas | 370/401 |
| 2008/0086746 A1 | 4/2008 | King | |
| 2008/0092056 A1* | 4/2008 | Walter et al. | 715/744 |
| 2008/0134043 A1* | 6/2008 | Georgis et al. | 715/733 |
| 2008/0134053 A1 | 6/2008 | Fischer | |
| 2008/0163059 A1 | 7/2008 | Craner | |
| 2008/0168495 A1* | 7/2008 | Roberts et al. | 725/39 |
| 2008/0168523 A1* | 7/2008 | Ansari et al. | 725/131 |
| 2008/0229352 A1* | 9/2008 | Pino et al. | 725/22 |
| 2008/0276279 A1 | 11/2008 | Gossweiler et al. | |
| 2009/0015657 A1 | 1/2009 | Wong | |
| 2009/0024910 A1* | 1/2009 | Kamat et al. | 715/204 |
| 2009/0043581 A1* | 2/2009 | Abbott et al. | 704/254 |
| 2009/0044237 A1* | 2/2009 | Keiter | 725/91 |
| 2009/0055868 A1 | 2/2009 | Wehmeyer et al. | |
| 2009/0089838 A1* | 4/2009 | Pino et al. | 725/40 |
| 2009/0113512 A1* | 4/2009 | Collet et al. | 725/132 |
| 2009/0135176 A1* | 5/2009 | Snoddy et al. | 345/419 |
| 2009/0158337 A1* | 6/2009 | Stiers et al. | 725/44 |
| 2009/0165046 A1 | 6/2009 | Stallings et al. | |
| 2009/0165053 A1 | 6/2009 | Thyagarajan et al. | |
| 2009/0199230 A1* | 8/2009 | Kumar et al. | 725/32 |
| 2009/0254557 A1* | 10/2009 | Jordan | 707/9 |
| 2009/0260038 A1* | 10/2009 | Acton et al. | 725/49 |
| 2009/0265213 A1* | 10/2009 | Hyman et al. | 705/10 |
| 2009/0293088 A1 | 11/2009 | Mukerji et al. | |
| 2009/0310030 A1 | 12/2009 | Litwin et al. | |
| 2009/0313295 A1* | 12/2009 | Blaxland et al. | 707/103 R |
| 2009/0319512 A1* | 12/2009 | Baker et al. | 707/5 |
| 2010/0037274 A1 | 2/2010 | Meuninck et al. | |
| 2010/0077435 A1 | 3/2010 | Kandekar et al. | |
| 2010/0114857 A1* | 5/2010 | Edwards et al. | 707/709 |
| 2010/0115554 A1* | 5/2010 | Drouet et al. | 725/41 |
| 2010/0131977 A1* | 5/2010 | San Jule et al. | 725/37 |
| 2010/0153999 A1* | 6/2010 | Yates | 725/39 |
| 2010/0162172 A1* | 6/2010 | Aroner | 715/838 |
| 2010/0162321 A1 | 6/2010 | Bradley | |
| 2010/0180029 A1* | 7/2010 | Fourman | G06F 17/30867 709/225 |
| 2010/0186029 A1* | 7/2010 | Kim et al. | 725/33 |
| 2010/0186034 A1 | 7/2010 | Walker | |
| 2010/0199312 A1 | 8/2010 | Chang et al. | |
| 2011/0191318 A1 | 8/2011 | Gilbey et al. | |
| 2012/0072851 A1 | 3/2012 | Stern | |
| 2012/0088477 A1* | 4/2012 | Cassidy | G11B 27/102 455/414.1 |
| 2012/0117026 A1* | 5/2012 | Cassidy | G06F 17/30053 707/634 |

(56) References Cited

U.S. PATENT DOCUMENTS

| | | | |
|---|---|---|---|
| 2012/0117488 A1 | 5/2012 | Amidon et al. | |
| 2012/0117581 A1 | 5/2012 | Curtis et al. | |
| 2012/0117595 A1 | 5/2012 | Svendsen et al. | |
| 2012/0117598 A1 | 5/2012 | Pons et al. | |
| 2012/0278835 A1* | 11/2012 | Bly, Jr. | H04N 21/4331 725/38 |
| 2012/0311635 A1* | 12/2012 | Mushkatblat | 725/43 |
| 2013/0018510 A1* | 1/2013 | Cvek et al. | 700/275 |
| 2013/0063489 A1* | 3/2013 | Hourie | G06F 17/30241 345/643 |
| 2013/0067519 A1* | 3/2013 | Yates | 725/47 |
| 2013/0080242 A1* | 3/2013 | Alhadeff | G06Q 30/0217 705/14.39 |
| 2014/0245334 A1* | 8/2014 | Belyaev | H04N 21/44222 725/9 |
| 2014/0334381 A1* | 11/2014 | Subramaniam | H04L 65/604 370/328 |

FOREIGN PATENT DOCUMENTS

| | | |
|---|---|---|
| WO | 97/17793 A1 | 5/1997 |
| WO | 99/35849 A1 | 7/1999 |

OTHER PUBLICATIONS

Abstract, "The Art of Human-Computer Interface Design," eds. Brenda Laurel and S. Joy Mountford, copyright 1990, Addison-Wesley Longman Publishing Col, Inc., Boston, Massachusetts, at <http://dl.acm.org/citation.cfm?id=575201>, from the ACM Digital Library, printed Jun. 26, 2012, 2 pages.

Abstract, Norman, Donald A., "The Invisible Computer," The MIT Press, Sep. 1998, copyright 1998, Donald A. Norman, at <http://mitpress.mit.edu/catalog/item/default.asp?ttype=2&tid=5160>, printed Jun. 25, 2012, 1 page.

Abstract, Rheingold, Howard, "Tools for Thought, the People and Ideas Behind the Next Computer Revolution," Simon & Shuster, New York, 1985, 2 pages.

Ali-Hasan, Noor F., "Exploring Social Media Scenarios for the Television," Proceedings of the International Conference on Weblogs and Social Media 2008 (ICWSM 2008), Mar. 30-Apr. 2, 2008, Seattle, Washington, copyright 2008, Association for the Advancement of Artificial Intelligence (AAAI) Press, Menlo Park, California, 8 pages.

"Average U.S. Home Now Receives a Record 118.6 TV Channels," at <http://www.nielsenmedia.com/nc/portal/site/Public/menuitem...>, Jun. 6, 2008, Nielsen Media Research, from Internet Archive, printed May 10, 2011, 2 pages.

Bott, Ed and Person, Ron, "Special Edition Using Windows 95 with Internet Explorer," ISBN 0789715538, copyright 1998, Que Corporation, excerpt from Chapter 19, found at <http://proquest.safaribooksonline.com/?x=1&mode=print&sortKey=title&sortOrder=asc&vie...>, printed Jun. 18, 2004, 4 pages.

Chang, Jui-Hung et al., "3PRS: a personalized popular program recommendation system for digital TV for P2P social networks," Multimed Tools Appl, vol. 47, pp. 31-48, 2010, published online Nov. 7, 2009, copyright 2009, Springer Science + Business Media, LLC, 18 pages.

Curro, Tony, "Express," Express by Infoseek internet web page, updated Oct. 27, 1998, copyright 1992-1998, Tony Curro, printed Nov. 18, 1998, 5 pages.

Davis, Jim, "The Miracle Box," CNET news.com, Nov. 17, 1998, copyright 1995-1998, CNET, Inc., printed Nov. 20, 1998, 4 pages.

"Dynamic Media.Com Opens for Business Just in Time for the Holidays," Business Wire, Dec. 3, 1998, copyright 1998, Business Wire, printed Dec. 4, 1998, 2 pages.

"Expway," Company, at <http://www.expway.com/company.php>, from the Internet Archive, dated Dec. 20, 2008, printed Jun. 7, 2012, 1 page.

Foley, James et al., "The Human Factors of Computer Graphics Interaction Techniques," IEEE CG&A, Nov. 1984, copyright 1984, IEEE, pp. 13-48, 36 pages.

"GeoCities and RealNetworks Team Up to Enable More Than 3 Million Homesteaders to Become Internet Broadcasters," PRNewswire, Company Press Release, RealNetworks, Inc., Mar. 1, 1999, copyright 1999, PRNewswire, printed Mar. 1, 1999, 4 pages.

Gibbs, W.W., "Taking Computers to Task," Scientific American, vol. 277, No. 1, Jul. 1997, pp. 282-289, 9 pages.

Henderson, Jr., D.A. and Card, S.K., "Rooms: The Use of Multiple Virtual Workspace to Reduce Space Contention in a Windows-Based Graphical Users Interface," Association for Computer Machinery, ACM Transactions on Graphics, vol. 5, No. 3, Jul. 1986, copyright 1987, ACM, pp. 211-243, 33 pages.

Hu, Jim, "Searching expressly on Infoseek," CNET News.com, Sep. 16, 1998, at <http://news.cnet.com/news/0/1005-200-333279.html?tag=st.ne.1002...>, copyright 1995-1999, CNET, Inc., printed Dec. 1, 1999, 3 pages.

"i-Watch DV-CUBE," brochure and technical specification, date unknown but obtained on or prior to May 19, 2009, 2 pages.

"Interactive Demo—Part 1—YouTube," Vision TV Interactive Demonstration, posted by yanikit on Mar. 12, 2009, printed Jun. 7, 2012, 3 pages.

Jameson, A. et al., "Enhancing Mutual Awareness in Group Recommender Systems," in B. Mobasher & S.S. Anand (Eds.), Proceedings of the Int. Joint Conference on Artificial Intelligence 2003 Workshop on Intelligent Techniques for Web Personalization, Aug. 9-15, 2003, Acapulco, Mexico, 8 pages.

Johnson, Jeff et al., "The Xerox Star: A Retrospective," Computer, No. 9, Sep. 1989, copyright 1989, IEEE, pp. 11-29, 18 pages.

Kelly, Susan Baake, "Mastering WordPerfect 5," copyright 1998, Sybex, Inc., Alameda, California, pp. 51-53 and 511-513, 9 pages.

Lee, Jae-Ho, "Automatic Video Management System Using Face Recognition and MPEG-7 Visual Descriptors," ETRI Journal, vol. 27, No. 6, Dec. 2005, pp. 806-809, 4 pages.

Livingston, Brian, Window Manager, "Free Windows tool makes meta searches a much easier task," World Electric internet web page, Nov. 2, 1998, printed Nov. 18, 1998, 3 pages.

"Macrovision—Digital Entertainment Technology Leader—Digital Conten...," at <http://macrovision.com/>, from the Internet Archive, dated Feb. 16, 2009, copyright 2009, Macrovision Solutions Corporation, printed May 4, 2012, 1 page.

Maes, P., "Agents that Reduce Work and Information Overload," Communications of the Association for Computer Machinery, vol. 37, No. 7, Jul. 1994, pp. 31-40 and 146, 11 pages.

McNeill, Alison, "TrustedOpinion.com Offers Netflix Subscribers More Relevant Movie Recommendations," at <http://www.prlog.org/10029611-trustedopinion-com-offers-netflix-subscribers-more-releva...>, Sep. 5, 2007, Palo Alto, California, printed May 15, 2009, 2 pages.

"Microsoft and Wink Communications Collaborate to Speed Adoption of Interactive Television Based on the ATVEF Specification," Microsoft TV Solutions News, Jun. 3, 1999, at <http://www.microsoft.com/tv/news/ne_wink_01.asp>, copyright 1998-1999, Microsoft Corporation, printed Jun. 15, 1999, 2 pages.

"Microsoft Announces Television Software Platform: Microsoft TV Platform Adaptation Kit (TVPAK)," PressPass, Jun. 14, 1999, at <http://www.microsoft.com/PressPass/press/1999/Jun99/TVPAKpr.htm>, copyright 1999, Microsoft Corporation, printed Jun. 15, 1999, 10 pages.

"Microsoft's TV Platform Makes Broadband Services a Reality for Cable Industry," PressPass, Jun. 14, 1999, at <http://www.microsoft.com/PressPass/features/1999/06-14ncta.htm>, copyright 1999, Microsoft Corporation, printed Jun. 15, 1999, 4 pages.

"Next Generation Mobile TV Guides," V1.0, copyright 2009, TV Genius LTD, originally found at <http://www.tvgenius.net/whitepapers/mobile.pdf>, 11 pages.

Pfaffenberger, Bryan, "Netscape Navigator: Surfing the Web and Exploring the Internet," 1995, Academic Press, Inc., pp. 88-90, 168-169, 110-111, and 286, 10 pages.

"ProNetLink.com will Broadcast the 1999 International Business Expo Live Over the Internet," PRNewswire, Mar. 1, 1999, copyright 1999, PRNewswire, printed Mar. 1, 1999, 2 pages.

"Ruel's Set-Top Net Page—Ruel's Review: Teknema Internet TV," Feb. 12, 1998, copyright 1996-1998, Ruel T. Hernandez, printed Nov. 20, 1998, 6 pages.

(56) References Cited

OTHER PUBLICATIONS

"Ruel's Set-Top Net Page—Ruel's Review: WebSurfer," Jul. 16, 1998, copyright 1996-1998, Ruel T. Hernandez, printed Nov. 20, 1998, 15 pages.

Selker, T., "Coach: A Teaching Agent that Learns," Communications of the Association for Computer Machinery, vol. 37, No. 7, pp. 92-99, Jul. 1994, 8 pages.

"Streaming Media—iParty Conference Call Available at A/V Newswire," Business Wire, Mar. 1, 1999, copyright 1999, Business Wire, printed Mar. 1, 1999, 1 page.

Tusch, R. et al., "Context-Aware UPnP-AV Services for Adaptive Home Multimedia Systems," International Journal of Digital Multimedia Broadcasting, vol. 2008, Article ID 835438, received Jun. 25, 2008, accepted Jul. 15, 2008, copyright 2008, Hindawi Publishing Corporation, 12 pages.

"TV Guide, TV Listings, Online Videos, Entertainment News and Celebrity News—TVGuide.com," at <http://www.tvguide.com,> from the Internet Archive, dated Feb. 1, 2009, printed Jun. 8, 2012, 3 pages.

"Video recorder scheduling code," Wikipedia, found at <http://en.wikipedia.org/wiki/Video_recorder_scheduling_code>, last modified May 4, 2009, printed Jul. 13, 2011, 3 pages.

WebTV Ad, "Everything you want is on the Web (Everything you Need is on this Page.)," copyright 1997, Sony Electronics Inc., printed Nov. 20, 1998, 2 pages.

WebTV Ad, "Now Everyone Can Experience the Internet," copyright 1998, Sony Electronics Inc., printed Nov. 20, 1998, 1 page.

WebTV Ad, "Sony and WebTV give you the Internet . . . the Easy Way," copyright 1995-1996, Sony Electronics Inc., printed Nov. 20, 1998, 2 pages.

WebTV Ad, "Sony and WebTV give you the Internet . . . the Easy Way," copyright 1997, Sony Electronics Inc., printed Nov. 20, 1998, 2 pages.

WebTV Ad, "Sony Brings the Internet to Your TV," copyright 1997, Sony Electronics, Inc., from the Internet Archive, dated Dec. 10, 1997, printed Jun. 22, 2012, 2 pages.

WebTV Ad, "Sony Consumer Electronics Guide—WebTV Internet Terminal," copyright 1998, Sony Electronics Inc., printed Nov. 20, 1998, 2 pages.

WebTV Ad, "Sony Consumer Electronics Guide: INT-W100," copyright 1998, Sony Electronics Inc., printed Nov. 20, 1998, 2 pages.

WebTV Ad, "Sony Consumer Electronics Guide: INT-W100," copyright 1998, Sony Electronics Inc., printed Nov. 20, 1998, 3 pages.

WebTV Ad, "Sony Consumer Electronics Guide: INT-W200," copyright 1998, Sony Electronics Inc., printed Nov. 20, 1998, 3 pages.

WebTV Ad, "Sony Consumer Electronics Guide: INT-W200," copyright 1998, Sony Electronics Inc., printed Nov. 20, 1998, 1 page.

WebTV Plus internet web page, "TV Crossover Links," printed Nov. 20, 1998, 1 page.

WebTV Plus internet web page, "TV Home," printed Nov. 20, 1998, 1 page.

WebTV Plus internet web page, "TV Listings," printed Nov. 20, 1998, 1 page.

WebTV Plus internet web page, "Web Home," printed Nov. 20, 1998, 1 page.

WebTV Plus internet web page, "WEB PIP," printed Nov. 20, 1998, 1 page.

WebTV Plus internet web page, "WebTV—E-Mail," printed Nov. 20, 1998, 1 page.

WebTV Plus internet web page, "WebTV—Favorites," printed Nov. 20, 1998, 1 page.

WebTV Plus internet web page, "WebTV—My WebTV," printed Nov. 20, 1998, 1 page.

WebTV Plus internet web page, "WebTV—Search," printed Nov. 20, 1998, 1 page.

WebTV Plus internet web page, "WebTV Plus," printed Nov. 20, 1998, 1 page.

"What is Express by Infoseek?," Express by Infoseek internet web page, copyright 1996-1998, Infoseek Corporation, printed Nov. 18, 1998, 3 pages.

"What's New at Express by Infoseek," Express by Infoseek Internet web page, earliest entry dated Sep. 16, 1998, copyright 1996-1998, Infoseek Corporation, printed Nov. 18, 1998, 3 pages.

"Widespread Deployment of Interactive TV Gains Steam With Fall Lineup of Enhanced Programming for WebTV Plus and WebTV for Windows," Microsoft TV Solutions, Jun. 14, 1999, at <http://www.microsoft.com/tv/news/ne_itvmom_01.asp>, copyright 1998-1999, Microsoft Corporation, 3 pages.

Wittig et al., "Intelligent Media Agents in Interactive Television Systems," Proceedings of the International Conference on Multimedia Computing and Systems, May 15-18, 1995, Washington, D.C., IEEE Comp. Soc. Press, pp. 182-189, 8 pages.

"XMLTV," at <http://xmltv.org/wiki/>, from the Internet Archive, dated Mar. 31, 2009, printed May 10, 2011, 4 pages.

Zimmerman, J. et al., "Chapter 5—TV Personalization System—Design of a TV Show Recommender Engine and Interface," Personalized Digital Television: Targeting Programs to Individual Viewers, eds. Ardissono, L., Kobsa, A., and Maybury, M., Kluwer Academic Publishers, Norwell, Massachusetts, 2004, 29 pages.

\* cited by examiner

SYSTEM AND METHOD FOR AGGREGATING DEVICES FOR INTUITIVE BROWSING

RELATED APPLICATIONS

This application claims the benefit of provisional patent application Ser. No. 61/163,086, filed Mar. 25, 2009, the disclosure of which is hereby incorporated herein by reference in its entirety.

FIELD OF THE INVENTION

The disclosure relates to a method for intuitively displaying media content available from numerous sources in a customizable manner.

BACKGROUND

According to a Nielsen Company report focusing on population, television ownership and advertising trends in the United States, the average U.S. home has 2.5 people, 2.8 TVs, and receives an average of 118 TV channels. Additionally, the number of DVRs in the average home is increasing. As the number of channels available at a plurality of devices in a home network increases, it is increasingly difficult to intuitively gain an understanding of what media content is available at any one time.

As a result, there exists a need to provide a user with an intuitive display by which the user can quickly and easily be made aware of media content of interest.

SUMMARY

In accordance with an exemplary and non-limiting embodiment, a media device comprises a communication interface communicatively coupling the media device to one or more other media devices and a controller associated with the communication interface adapted to access one or more templates each comprising a layout of a graphical user interface (GUI) and identify one or more other media devices from which media content may be streamed and one or more media content streams available from each of the one or more media devices. The controller is further adapted to determine, based upon the one or more templates and the one or more media content streams, at least one of the media content streams to display, acquire the at least one of the media content streams for display in accordance with the one or more layouts and output the at least one of the media content streams to a display for presentation in the GUI in accordance with the one or more layouts.

In accordance with another exemplary and non-limiting embodiment, a computer-readable medium embodied in an article of manufacture encoded with instructions for directing a processor of a media device to access one or more templates each comprising a layout of a graphical user interface (GUI) and identify one or more other media devices from which media content may be streamed and one or more media content streams available from each of the one or more media devices. The processor is further directed to determine, based upon the one or more templates and the one or more media content streams, at least one of the media content streams to display, acquire the at least one of the media content streams for display in accordance with the one or more layouts and output the at least one of the media content streams to a display for presentation in the GUI in accordance with the one or more layouts.

In accordance with another exemplary and non-limiting embodiment, a method comprises accessing one or more templates each comprising a layout of a graphical user interface (GUI), identifying one or more other media devices from which media content may be streamed and one or more media content streams available from each of the one or more media devices and determining, based upon the one or more templates and the one or more media content streams, at least one of the media content streams to display. The method further includes acquiring the at least one of the media content streams for display in accordance with the one or more layouts, and outputting the at least one of the media content streams to a display for presentation in the GUI in accordance with the one or more layouts.

In accordance with another exemplary and non-limiting embodiment, a computer-readable medium embodied in an article of manufacture encoded with instructions for directing a processor of a media device to receive a media item attribute, identify one or more media items based upon the media item attribute and an aggregated content guide and instruct one or more media devices to tune to the one or more media items and provide one or more media content streams corresponding to the one or more media items. The processor is further directed to receive the one or more media content streams and output each of the one or more media content streams for display in an associated thumbnail.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE EMBODIMENTS

Figure 1:
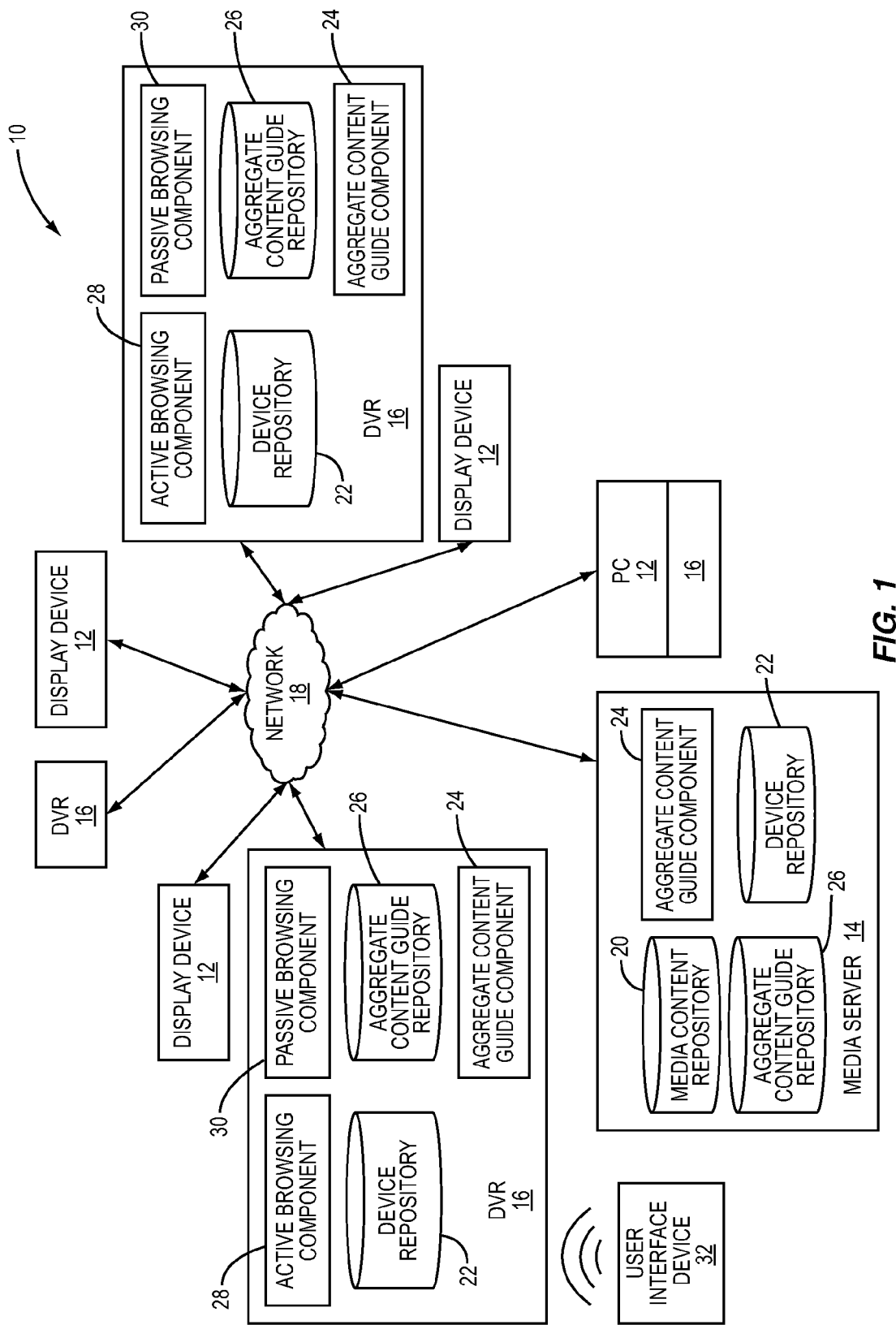
FIG. 1 illustrates a system incorporating a network for communicatively coupling a plurality of media devices and displays with a media server according to an exemplary embodiment.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In accordance with exemplary embodiments disclosed herein, a system is described to improve the utilization of numerous media displays and tuners, which are not currently in use, by providing an intuitive passive browsing mode. In this passive browsing mode, the system operates to display media content on a media display that may be of interest to a user of the system based on a template which may be personalized.

In an exemplary embodiment, the user template is a data record that includes background content, one or more user content thumbnails and an alert configuration. The alert configuration defines under what circumstances currently broadcast media content is displayed. Once displayed, there is shown to a user an indicator of how well the displayed media content matches the preferences described in the template, such as those defined in the alert configuration. Other displayed indicators may display relevance to a particular segment of a show, score alerts, end of game notices, etc. In accordance with various exemplary and non-limiting embodiments described below, a template may be associated with a user and in such instance is referred to as a "user template". In accordance with another exemplary embodiment, one or more templates, which may be referred to herein as "system templates", may be provided by the system and may function to display media items in the absence of a personalized user template. It is understood that a system template may be modified by a user to produce a user template. Furthermore, a system template may be modified in a manner that does not incorporate user information and, while no longer a system template, is referred to herein as a "template".

An aggregated content guide provides a universal view (and location) of media content available on all communicatively coupled devices within, for example, a home. As described more fully below, the system uses an aggregated content guide to determine the best allocation of channel to tuning devices and manages the video acquisition and display. The system automatically utilizes available devices, if necessary, to prepare and/or optimize the media content to be displayed within the browsing interface. As used herein, to "optimize" means to enhance the display of media content through both the selection of the media content and the manner in which the media content is displayed.

In the exemplary and non-limiting embodiments described below, various features and optimizations are described to provide a user with an intuitive and optimized browsing interface. One of the components described is "tuner aggregation". The tuner aggregation component operates to perform actual aggregation of media content as well as virtual aggregation described more fully below. The tuner aggregation and other optimizations also support an "active browsing mode" of the system. When operating in active browsing mode, a user is actively interfacing with the system in order to quickly, and intuitively, find content of interest.

In the exemplary and non-limiting embodiments that follow, there is described both passive browsing and alerts whereby the system operates to continually monitor multiple media content streams and display media content of interest to the user as well as alerts. In other exemplary embodiments there is described active browsing whereby the system provides users with the ability to browse available channels in order to quickly and intuitively find media content of interest. In other exemplary embodiments there is described tuner aggregation including both the actual and virtual aggregation of tuners to provide an intuitive browsing interface that includes multiple live media streams. Tuner aggregation further comprises video optimizations and commercial optimizations. In accordance with yet other exemplary and non-limiting embodiments, the system operates to manage the selection and allocation of devices and channels based on, for example, an aggregated channel guide and device characteristics such as availability, capability and content source, user preferences, and the like.

FIG. 1 illustrates a system 10 incorporating at least one media server 14, one or more media devices 16, and one or more display devices 12 each associated with at least one media device 16. Each of the media devices 16, display devices 12, and media server 14 are communicatively coupled with one another via a network 18.

As used herein, a "viewer" of a display device may be interchangeably referred to as a "user" of system 10.

As used herein, "display device 12" refers to any device capable of receiving media content and displaying, playing or otherwise rendering the media content. Examples of display devices 12 include, but are not limited to, laptop computers, desktop computers, personal digital assistants (PDAs), mobile telephones, televisions (TVs), portable game players, and the like.

As used herein, "media device 16" refers to any and all devices capable of acquiring and outputting media content for display. Examples of media devices 16 include, but are not limited to, digital video recorders (DVRs), set top boxes (STBs), computers, and the like. In exemplary embodiments described below, media devices 16 may query other media devices 16 to ascertain not only what media content is available but also the media device's current utilization and resultant ability to stream one or more media content streams to the querying media device 16.

As used herein, "media server 14" refers to any device capable of (1) storing media content, such as in a media content repository, (2) receiving requests from media devices 16 for stored media content and (3) facilitating the streaming or transfer of requested media content to a media device 16.

As described more fully below, in an exemplary embodiment, each media device 16 and media server 14 may comprise an aggregate content guide component 24, an aggregate content guide repository 26 and a device repository 22. In an exemplary embodiment, each device repository 22 forming a part of a media device 16 stores information about the media device 16, including, but not limited to, user templates, a current mode, current utilization, addresses of one or more other media devices 16 comprising system 10, and an address of media server 14. When forming a part of media server 14 device repository 22 likewise stores addresses of one or more other media devices 16. Media server 14 may also store in device repository 22, in a centralized fashion, user templates stored on one or more user devices 16. As a result, media server 14 may serve, in accordance with some embodiments described below, as a centralized source of information regarding each of one or more media devices 16.

In accordance with an exemplary embodiment, aggregate content guide component 24 operates to query each other media device 16 to obtain information indicative of media content available at each media device 16. Examples of such information indicative of media content available may include, for example, a listing of channels and information identifying media content available from each channel over cable or via satellite transmission. The information identifying the media content may include metadata associated with the media content such as a unique identifier of the media content, a title of the media content, a rating of the media content, a genre of the media content, a description of the media content, a duration of the media content, and the like. As information regarding available media content from each media device 16 is received, in response to the query or queries, the information is aggregated and stored as an aggregated content guide, such as in aggregate content guide repository 26. As described more fully below, the information stored in aggregate content guide repository 26 may be utilized by both active browsing component 28 and passive browsing component 30. Aggregate content guide component 24 may be invoked or otherwise executed at predetermined times in accordance with one or more parameters stored in device repository 22, at predetermined intervals, or in response to a trigger, such as a user requesting the invocation of active browsing component 28. In an exemplary embodiment, aggregate content guide component 24 is executed on a media device 16 with the resulting aggregate content guide stored at the media device 16. In another embodiment, aggregate content guide component 24 is executed on a media server 14 with the resulting aggregate content guide stored in a centralized manner at the media server 14. In such an embodiment, media devices 16 may query the aggregate content guide repository 26 of the media server 14.

As illustrated, a single device, such as a personal computer (PC) may be formed of both a display device 12 and a media device 16. There is further illustrated a user interface device 32. User interface device 32 allows a user to interface with a media device 16, such as via the display of information on a display device 12 associated with the media device 16. Examples of user interface devices include, but are not limited to, wireless or wired remote controls, PDAs, cell phones, and the like.

As illustrated, the communicative coupling of media server 14, media devices 16 and display devices 12 may be facilitated via network 18. Network 18 may be a distributed public network such as, but not limited to, the Internet, a hard wired local area network (LAN), a wireless network, or some combination thereof. In addition to the network 18, various media devices 16 and display devices 12 may engage in direct wireless communication with each other and media server 14 according to, for example, one of the suite of IEEE 802.11 standards, the Bluetooth standard, or the like.

While in accordance with some exemplary embodiments display devices 12, media server 14, and media storage devices 16 are described as separate and distinct entities, the present disclosure is not so limited. Rather, the disclosure is drawn broadly to encompass devices which may combine the function of one or more display devices 12, media server 14, and/or media storage devices 16 in a single device. As used herein, when referring to a device that incorporates, for example, both media server and media content storage capabilities, such as a personal computer, references to a "media server 14" and "media storage device 16" refer to those subsets of functionality of the device devoted to the performing the referenced functions.

In general, as described more fully below in accordance with an exemplary embodiment, media devices 16 operate, in a passive browsing mode, to facilitate the display of information on a display device 12 in accordance with a user defined user template. Media devices 16 further operate, in an active browsing mode, to facilitate the display of information on a display device 12 to permit and to acquire and display media content in a desired fashion.

The following example illustrates an exemplary embodiment of the system according to the disclosure below. It is Sunday afternoon and Joe is doing chores around the house. Joe has the system set to "Screen-saver" mode. Joe has defined a passive browsing user template instructing the system to display a web-cam as the background (if the video stream is active) on a display device, personal content in a thumbnail view, and specific content alerts. Joe has defined alerts as: a. genre: sports, b. subgenre: NY Giants, New York Yankees, Duke University, c. Time Left: <30 minutes. On Joe's preferred display, the system highlights a live feed from the HD web-cam that he has installed at the family's horse stable. Also, Joe's favorite photos are rotated in a thumbnail display. Utilizing the available tuners, the system monitors content matching Joe's preferences. The system recognizes that two programs match Joe's alert preferences. The system instructs two (2) available tuners to tune to the respective channels to obtain the media content of the two programs. Thumbnail-sized video streams are displayed via a GUI on a display device showing the live content of the two programs along with other (contextually relevant) information regarding the media content. Joe did not realize that the NYG-NE game was on, but he is too busy to watch right now, so he uses his smart phone to the display and selects RECORD for the game.

Figure 2:
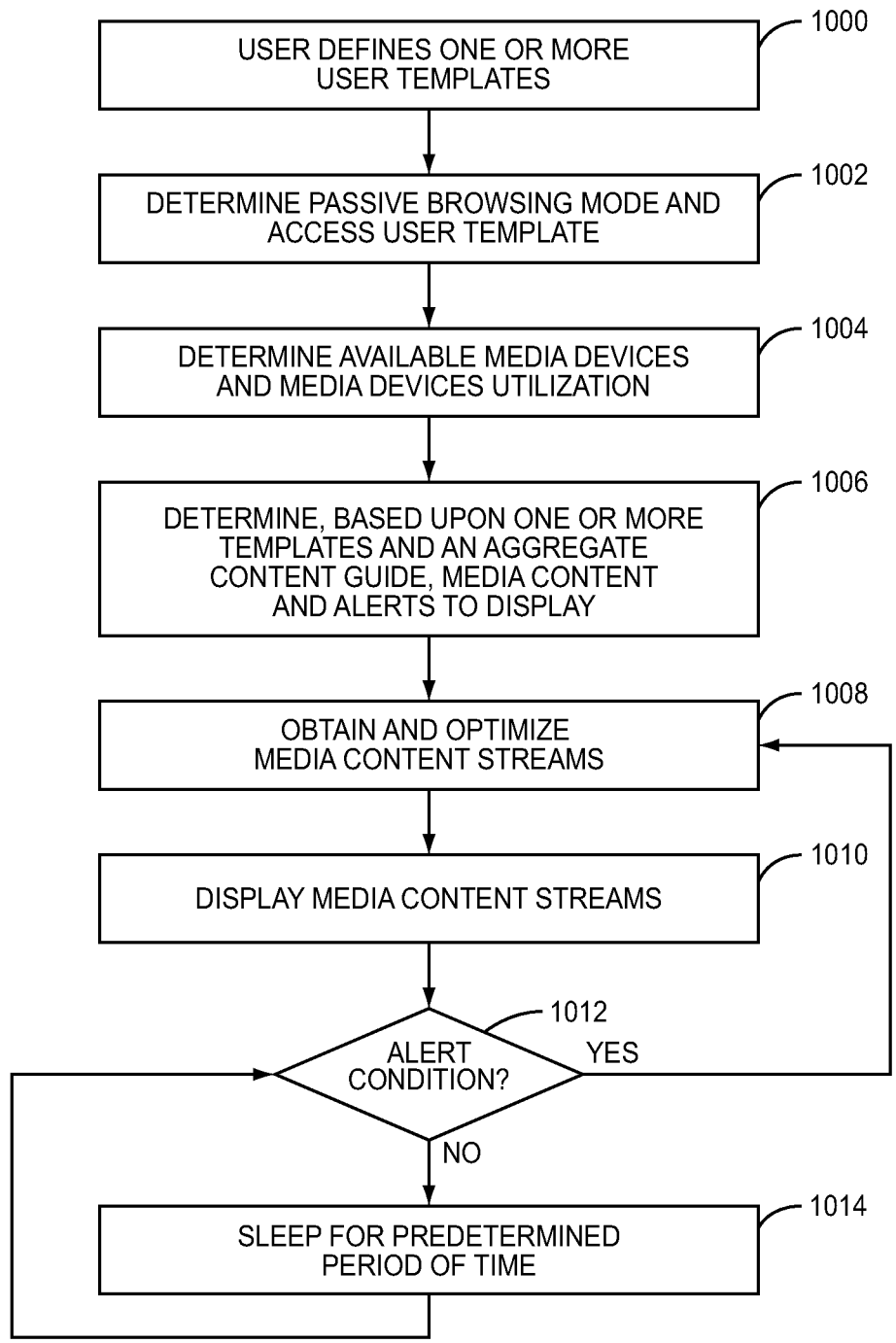
FIG. 2 is a flowchart of a method for performing passive browsing according to an exemplary embodiment.
Figure 3:
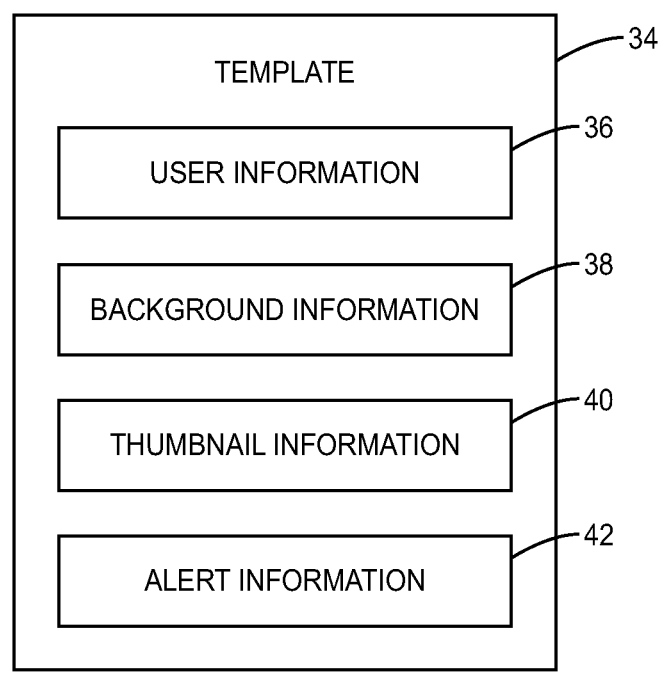
FIG. 3 is a diagram of a template according to an exemplary embodiment.

FIG. 2 is an illustration of a flow chart of the operation of system 10 performing passive browsing. First, a user defines a passive browsing user template 34 (step 1000). FIG. 3 is an illustration of the structure of an exemplary embodiment of a user template 34. User template 34 includes user information 36, background information 38, thumbnail information 40 and alert information 42. User information 36 may include any and all information indicative of attributes of a user including, but not limited to, security information (e.g., a password, login id, etc.), a unique identifier, voice print, facial recognition parameters and the like. In an exemplary embodiment, user template 34 is defined in a structured, text-based file such as XML. In another embodiment, user templates 34 may be defined in other textual formats, by a database, or other such mechanisms. User template 34 creation and editing tools may be provided to assist the user such as by the provision of one or more graphical user interfaces (GUIs) displayed on a display device 12 with the information obtained from each GUI transmitted and stored in a user template 34.

User templates 34 record user preferences for identifying media content and related information to be displayed as well as the preferred layout and positioning of such media content and information. Specifically, background information 38 records information describing the identity and location of media content to be displayed in the background 44 (shown in FIG. 4) on a display device 12. Likewise, thumbnail information 40 records information describing the identity and location of media content to be displayed in one or more thumbnails 46 (FIG. 4) on a display device 12.

Figure 4:
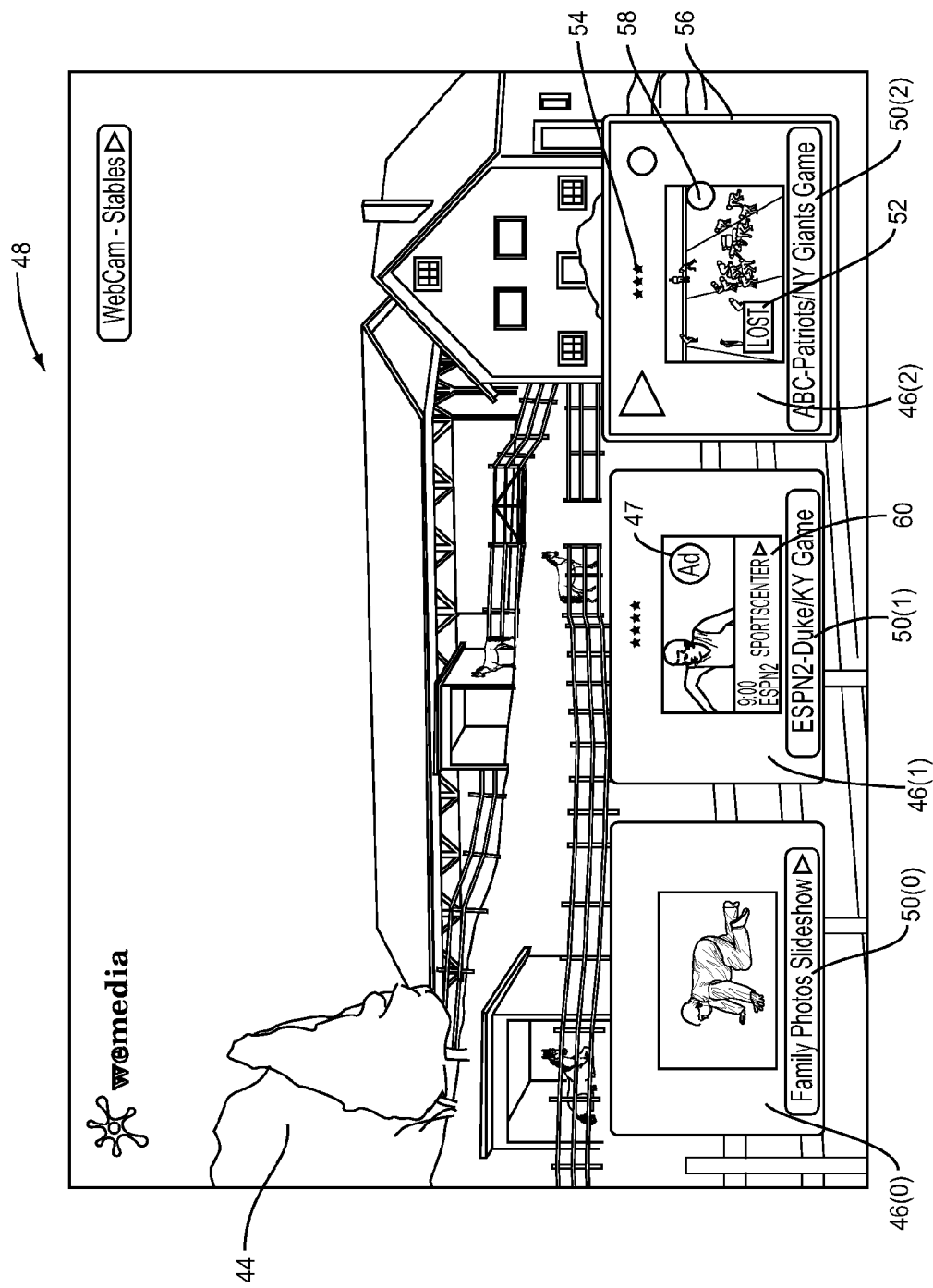
FIG. 4 is an illustration of an exemplary passive browsing GUI.

User template 34 also contains alert information 42. Alert information 42, described more fully below, is comprised of parameters and conditions that specify what media content is to be displayed and how it is to be displayed in response to what conditions. The user can define the parameters utilized in the alert notification 42. For example, a user may specify, via a user template 34, a desire for system 10 to display a media content comprising video of any active sporting event in a thumbnail 46 (FIG. 4). Expanding on the example, the user may specify to only show the sporting event media content in a thumbnail 46 if the sporting event is 80% or more complete.

Examples of user template parameters include, but are not limited to, (1) type of media content (e.g., genre, sub-genre, etc.), (2) duration (or time remaining) in the media content, (3) content match to user preferences (i.e., how close a match is media content to the user's preferences (such as media content type), (4) content match to other users (i.e., show the content if N users in the current user's social network, or other anonymous users who closely match the current user's profile, have indicated a preference for the media content via a user template 34), (5) alert video type (e.g., "display live thumbnail video", "display snapshot every n seconds", "display program logo/image", etc.), (6) alert notification type (e.g., "highlight in specific color", "change thumbnail size up/down", "audible alert", etc.), (7) user presence influence (e.g., "tailor content to all users detected", "tailor only to the user who is present and who defined the template", "ignore presence information and utilize user template 34", etc.), and/or (8) user presence frequency (defines how frequently the system checks for user presence). The changing of any of these parameters may act as a trigger, as discussed earlier. With specific regards to user presence influence and user presence frequency, media devices 16 may operate to determine users currently viewing or in proximity to a display device 12 associated with the media device 16 or any other display device 12. In an exemplary embodiment, each media device 16 may utilize an input device to capture sound and image data which may be matched against information in user information 36 to determine the presence of a user. Once the presence of a user is determined, the user's presence may be stored in device repository 22 and made available, via responses to queries, to other media devices 16. User presence data may also be transmitted to media server 14 for storage in a device repository 22 in a centralized fashion and available to all media devices 16. Once defined, the user template 34 is stored, such as in device repository 22. In an exemplary embodiment, user template 34 is stored in a centralized location such as in device repository 22 of media server 14.

In addition to the exemplary user template parameters described above, users may have defined elsewhere in system 10 other parameters as may be defined in an overall user profile. As described above, parameters defined in user templates 34 instruct the system when and how to present content in the passive browsing mode. In an exemplary embodiment, parameters defined in a user template 34 will override any settings in a user profile.

These settings and preferences in a user template 34 may be utilized by both the active browsing and passive browsing modes of system 10. The passive browsing mode may also operate in "alert only mode" in which the display is completely off until content that exceeds a specified alert threshold is identified, such as may be stored in alert information 42. At that time, the display is enabled as described below and an optional audio signal is given. After a period of time the display turns itself off again. In another embodiment, the system 10 may simply utilize an aggregate channel guide to identify alerts. For example, the system 10 continually monitors channels of interest to a user utilizing the available tuners. If there are more channels to monitor than tuners available, the system 10 may cycle through batches of channels at a predefined interval.

Returning to FIG. 2, next, passive browsing component 30 operates to determine if a media device 16 is presently configured to be in a passive browsing mode and, if it is, accesses the user template 34, such as from device repository 22 (step 1002). In one embodiment, passive browsing component 30 operates to periodically query a device repository to access information indicative of a mode of the media device 16. In another embodiment, passive browsing component 30 may operate to query a device repository to access information indicative of a mode of the media device 16 in response to a trigger, such as the activation of a display device 12 associated with the media device 16.

Next, passive browsing component 30 operates to determine available media devices 16 and their utilizations (step 1004). More specifically, passive browsing component 30 operates to determine available media devices 16 from which may be obtained current media content and the media content available from the media devices 16. In an exemplary embodiment, media device 16 queries a device repository 22 to obtain an address for each other media device 16 communicatively coupled to the querying media device. In an exemplary embodiment, this information may be obtained by a single query to a centralized device repository 22 on media server 14. Having determined the addresses of other media devices 16, a media device 16 may query each other media device 16 and receive information indicative of both media content available from the media device 16 as well as the device utilization of each media device 16. This information may be stored in, for example, aggregate content guide repository 26. Again, in an exemplary embodiment, this information may be obtained by a single query to a centralized aggregate content guide repository 26 on media server 14. Aggregate content guide component 24 may be invoked at regular intervals (e.g., every 30 seconds) or in response to a trigger (e.g., another media device 16 going active).

As described above, device utilization may be indicative of a number of tuners available to receive media content and stream the media content to a requesting media device 16. For example, a media device may have two (2) tuners for receiving media content from two separate channels, but, if one tuner is presently being utilized by a user of an associated display device 12, there is only one (1) tuner available to receive media content and transmit the media content to a requesting media device 16.

Then, passive browsing component 30 determines, based upon one or more user templates 34 and an aggregate content guide, media content and alerts to display (step 1006). Specifically, one or more accessed user templates 34 are used to filter the information in, for example, aggregate content guide repository 26, to determine what media content is available from which media device 16 that matches the parameters of the one or more user templates 34. In addition to determining matches, passive browsing component 30 may determine the degree to which media content matches a user template 34. For example, if a user defines user template parameters indicating a preference for a genre of "sports" and a sub-genre of "NY Giants", media content comprising two different NFL games will match the genre parameter while an NFL game comprising the NY Giants will match both the genre and sub-genre parameters and will, as a result, match the user template 34 to a greater degree.

Then, passive browsing component 30 obtains and optimizes the display of media content determined in step 1006 on an associated display device 12 (step 1008). Specifically, passive browsing component 30 operates to display the most live streams of media content possible, containing media content that is of the most interest to the user.

As noted above, the aggregated channel guide stores information including, for example, what media content is available, the source for the media content, who is currently viewing the content, etc. Further, device repository 22 stores information indicative of the current state of other media devices 16, their utilization and the like. In an exemplary embodiment, passive browsing component 30 may optimize a media content stream through a selection of a media device 16 best able to provide the media content. For example, if a user has set strict parental controls on a media device 16 and the media device 16 cannot filter the content, then the media device 16 would only be utilized for "approved" channels or media content. In another example, a user may prefer supplemental content for his favorite shows. As a result, passive browsing component 30 may operate to identify and utilize a media device 16 with Internet access to obtain the desired supplemental content. In accordance with an exemplary embodiment, passive browsing component 30 may stream the most preferred media content from media devices 16 capable of providing the best quality media content stream. For example, while browsing sports, passive browsing component 30 may stream the Super Bowl from a media device 16 able to provide the best quality media content stream of the Super Bowl and receive a bowling tournament from a media device 16 that is not capable of providing as high quality a media content stream. In addition, it is noted that different media devices 16 may have access to different media content sources affecting the selection of different media devices 16 for the provision of different media content.

In exemplary embodiments, user preference information stored in user template 34 is utilized to determine media content for display as well as the manner in which the media content is displayed. In an exemplary embodiment, user template 34 includes preferred user interface settings such as a preferred number of thumbnails and preferred secondary criteria to be used when choosing/optimizing media content to be displayed (e.g., degree of interest match, degree of profile match, etc). In other exemplary embodiments, passive browsing component 30 further considers the availability of supplemental content related to media content, parental controls associated with media content, and genre/category preferences of a user when deciding which media content to display. Passive browsing component 30 may further consider alert settings as described more fully below when determining media content to display.

As noted above, it may be the case that a first media device 16 has access to more than one media content item that has been requested to be streamed to another media device 16 but is unable to stream both media content items simultaneously. This may result, for example, if a media device 16 has two tuners but one is currently utilized by another user.

In an exemplary embodiment, there is described the virtual aggregation of tuners to address this shortcoming. Specifically, as described below, virtual aggregation of tuners operates to accommodate an instance where there are not a suitable number of tuners available to acquire and stream the desired media content, or to simply provide more concurrent thumbnail views. Virtual aggregation of tuners operates in two modes: (1) video and (2) image. In both modes, two (2) or more channel requests for media content are sent to a single media device 16. In video mode, the media device receiving the request rotates acquisition of the two or more channels of media content on a single tuner at predetermined intervals. For example a single tuner acquires 30 seconds of a first media content and streams the first media content to a requesting media device 16. The same tuner then acquires 30 seconds of a second media content and streams the second media content to a requesting media device 16 before switching back to the first media content. As each media content stream is received by the requesting media device 16, passive browsing component 30 directs each stream to a different thumbnail 46. After each media content stream is displayed in a thumbnail 46, the media content is repeated in the same thumbnail 46 one time while the other thumbnail displays the other media content stream. In an exemplary embodiment, passive browsing component 30 records each media content stream as it is received, such as in aggregate content guide repository 26. In this manner, each media content stream is displayed as it is received with the second display retrieved from memory.

In exemplary embodiments of browse mode, passive browsing component 30 operates, as in video mode, to request and receive two streams of media content. However, in image mode, each received stream consists of a single image and the interval between the streaming of different media content is comparatively short, such as on the order of a subsecond. Upon receiving each requested media content stream, passive browsing component 30 displays each media item content stream, comprised of an image, to a respective thumbnail 46. In this manner, the illusion of continuous motion is achieved in each thumbnail 46.

As described above, passive browsing component 30 performs optimization to the video prior to displaying in the thumbnails. In exemplary embodiments, various optimizations may be performed on the media device 16 (e.g., on a DVR) from which media content is streamed, on a requesting media device 16 or on another media device 16 or media server 14 that may be idle but has the required capabilities. The following exemplary preparations and optimizations may be performed on media content. In a first example, commercial optimization is performed whereby if streamed media content is currently streaming an advertisement, passive browsing component 30 operates to display a loop of the previous 15 seconds of the media content stream prior to the advertising segment in a thumbnail 46. In such an instance, an icon, or other indication may be displayed alongside the thumbnail 46 to inform the user that a commercial is currently being streamed. In another embodiment, video optimization may be employed. In such an instance, the quality of media content is altered (e.g., reduced in resolution) for display based on a thumbnail 46 size. In addition, other video analysis techniques may be employed such as zooming in on the critical parts of a media content stream. In another embodiment, content filtering may be performed such as based on parental controls or other preferences. In such an instance the media content to be displayed in a thumbnail 46 may be filtered to match the preferences set for the users watching the display device 12 on which the media content is displayed.

It is further noted that, in addition to streaming media content, passive browsing component 30 may also operate, in accordance with user template 34, to retrieve media content comprising still images for display, such as from media content repository 20 of media server 14. Once media content has been acquired and optimized, passive browsing component 30 operates to display the media content in accordance with a user template 34 on an associated display device 12.

FIG. 4 is an illustration of an exemplary passive browsing GUI 48 for displaying media content on a display device 12 in passive browsing mode. In the exemplary embodiment illustrated, passive browsing GUI 48 includes a background 44 and three thumbnails 46(0)-46(2). In the first thumbnail 46(0), image stills are displayed in succession as a slide show. As described above, parameters defining, for example, the source of the images, the duration to display each image, etc. may be defined in a user template 34 such as in thumbnail information 40. The second thumbnail 46(1) is displaying a frame or video loop indicating an upcoming basketball game between Duke and Kentucky. The third thumbnail 46(2) is displaying a stream of a football game between the Patriots and the NY Giants with a picture-in-picture element 52 announcing the future display of the television show "Lost".

In accordance with an exemplary embodiment, a user may temporarily override user template 34 parameters to fine tune the display of a thumbnail 46. For example, a user may select, such as via a user interface device 32 in communication with a media device 16, a profile match indicator 54. For example, selection of a profile match indicator 54 may cause the media device 16 to identify and display media content that best matches a user template 34. In accordance with other exemplary embodiments, the selection or activation of a component of passive browsing GUI 48 may cause the media device 16 to identify and display media content that may be of interest to other users in a home.

As illustrated, graphic indicators on thumbnails 46 may be displayed alongside or incorporated in thumbnails 46 to assist a viewer. For example, profile match indicator 54 provides an indication of how well the media content matches the user's preferences such as described in a user template 34. A border 56 may indicate that someone in a house utilizing the system 10 is watching the media content displayed in the thumbnail 46. Other indicators may include an indicator to allow the user to view the media content currently streaming or as another user is viewing. Yet other graphic indicators may include user image icons indicating that family or friends are watching the media content within a home comprising system 10. In an exemplary embodiment, a commercial indicator, such as an "Ad" icon 47, may indicate that media content is currently showing an ad, while further indicating that the media content displayed in the thumbnail 46 is not the ad but is rather the most recent media content from the show. In another exemplary embodiment the time remaining for media content may be displayed, such as in thumbnail text 50. In yet other exemplary embodiments, an information button 58 may be displayed. Information button 58 may inform a user that additional metadata or user-generated content is available for the media content. Selecting or otherwise activating information button 58 may cause the media device 16 to retrieve and display a portion of the additional metadata such as in thumbnail text 50. In yet other exemplary embodiments, graphic indicators may display indications of the relevance of a particular segment of media content, score alerts, end of game notices, and the like.

Note that there are illustrated two different ways of depicting upcoming media content. If, for example, media content is close to completing or a media content of interest to the user is upcoming next, information and/or video of the upcoming program may be displayed. For example, thumbnail 46(1) displaying a Duke-UK game shows a simple overlay 60 at the bottom of thumbnail 46 with the time and title of the media content and an arrow. The user may select the arrow to obtain more detail. In another example, thumbnail 46(2) displaying a NYG-NE game displays a thumbnail of the preview of the media coming up next in picture-in-picture element 52.

Returning to FIG. 2, passive browsing component 30 then displays the optimized media content streams (step 1010) and proceeds to monitor for additional alerts (step 1012). If passive browsing component 30 determines a condition satisfying an alert description in alert information 42, processing continues to step 1008 where media content streams are once again obtained and optimized for display. Conversely, if it is determined that no alert condition exists, passive browsing component 30 sleeps for a predetermined amount of time before proceeding once again to step 1012 (step 1014).

In addition to the passive browsing mode illustrated and described above, a media device 16 may likewise execute an active browsing component 28. Active browsing component 28, as described more fully below, operates to display media content selections to a user by utilizing the thumbnails 46 described above with reference to passive browsing.

Figure 5:
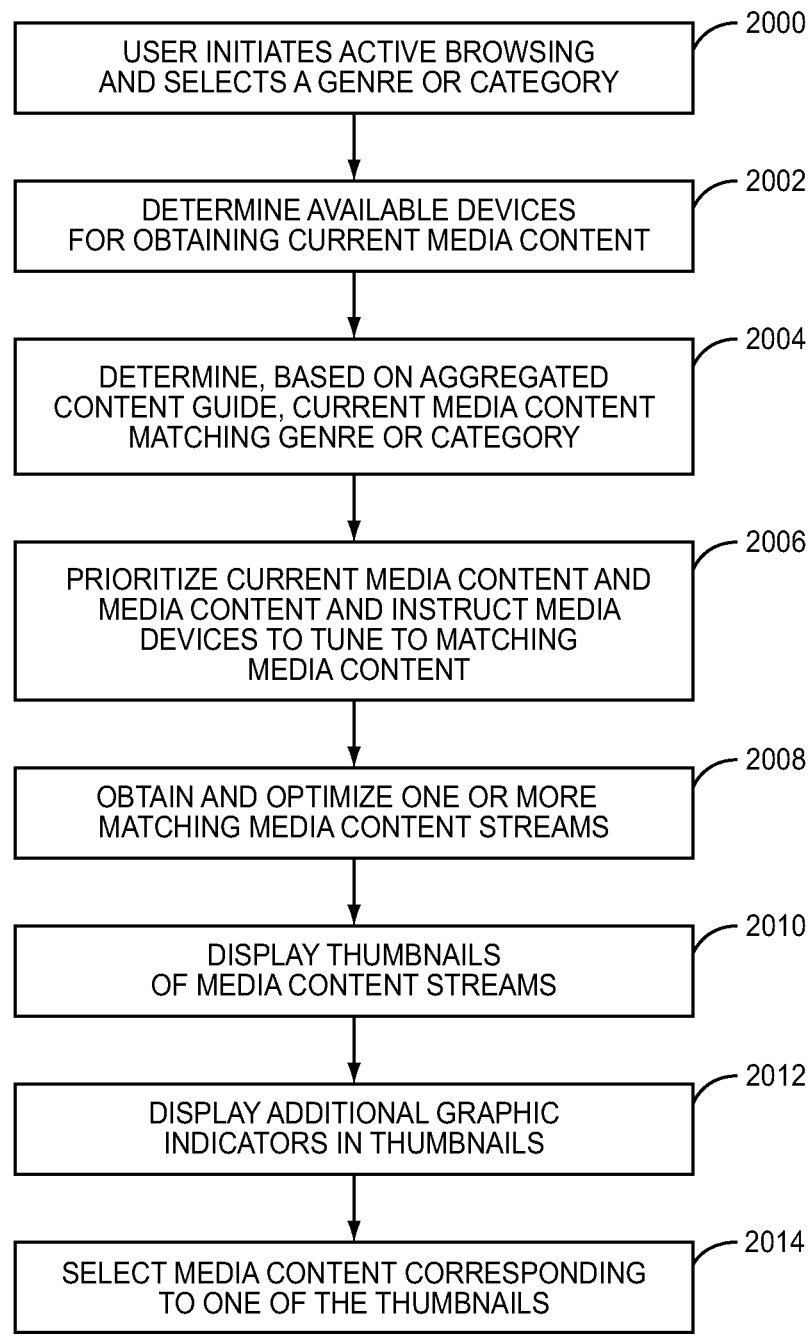
FIG. 5 is a flowchart of a method for performing active browsing according to an exemplary embodiment.
Figure 6:
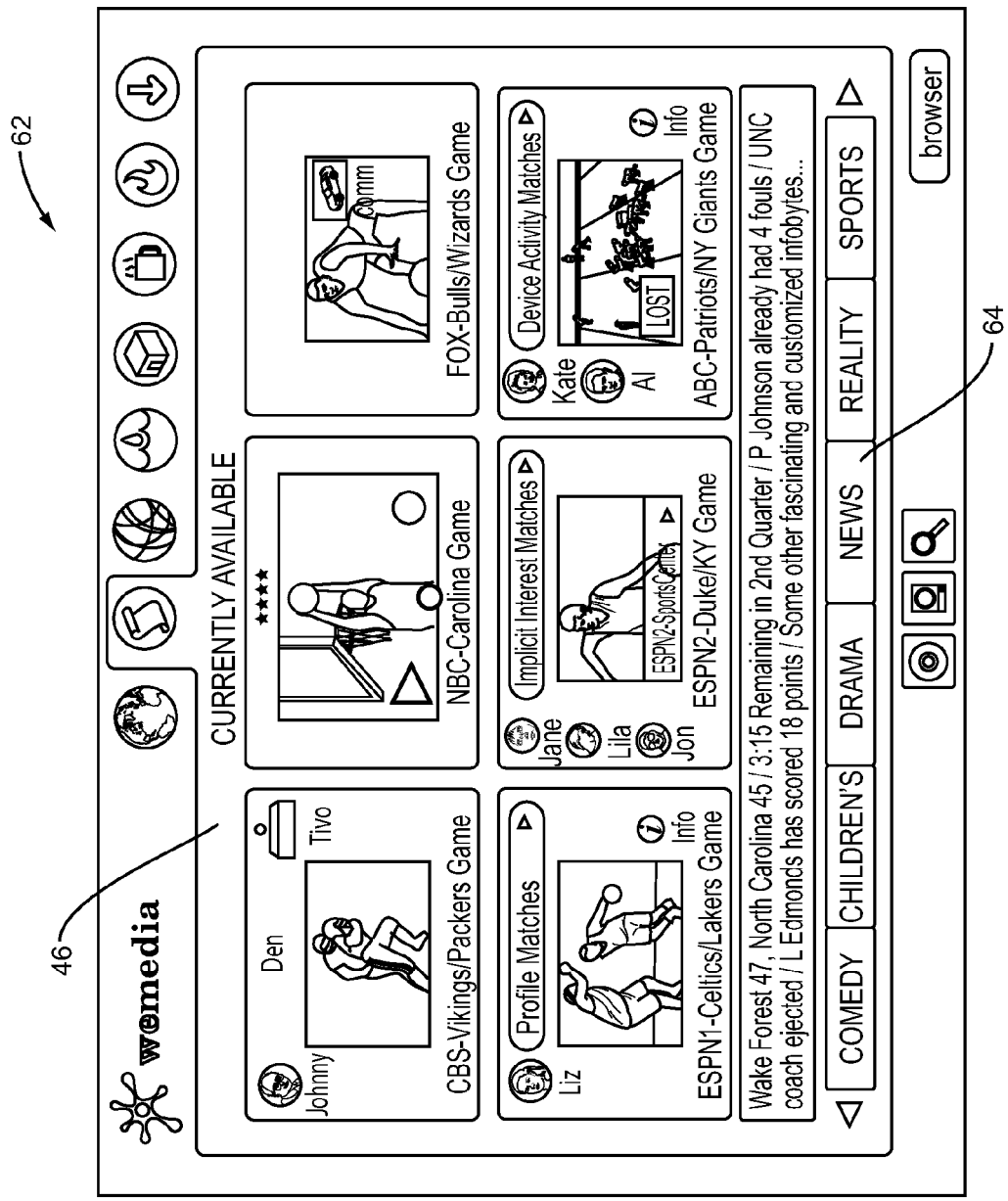
FIG. 6 is an illustration of an exemplary active browsing GUI.

FIG. 5 is an illustration of a flow chart for performing active browsing according to an exemplary embodiment. First, a user initiates active browsing and selects a media item attribute, such as a genre or category for browsing (step 2000). FIG. 6 is an illustration of an exemplary active browsing GUI 62 for active browsing. As illustrated, active browsing GUI 62 comprises one or more thumbnails 46 and genre selectors 64. In an exemplary embodiment, active browsing component 28 is invoked via a user interface device 32 such as a remote control.

Returning to FIG. 5, next, active browsing component 28 operates to determine available media devices 16 from which may be obtained current media content and the media content available from the media devices 16 (step 2002). In an exemplary embodiment, media device 16 queries a device repository 22 to obtain an address for each other media device 16 communicatively coupled to the querying media device. In an exemplary embodiment, this information may be obtained by a single query to a centralized device repository 22 on media server 14. Having determined the addresses of other media devices 16, a media device 16 may query each other media device 16 and receive information indicative of both media content available from the media device 16 as well as the device utilization of each media device 16. This information may be stored in, for example, aggregate content guide repository 26. Again, in an exemplary embodiment, this information may be obtained by a single query to a centralized aggregate content guide repository 26 on media server 14.

In accordance with another exemplary embodiment, aggregate content guide component 24 may be executed or otherwise invoked to query and receive from each other media device 16 information indicative of both media content available from the other media device 16 as well as the device utilization of each other media device 16 with the received information stored in, for example, aggregate content guide repository 26. Aggregate content guide component 24 may be invoked at regular intervals (e.g., every 30 seconds) or in response to a trigger (e.g., another media device 16 going active).

Next, active browsing component 28 determines, based on the aggregated content guide, currently playing media content matching the selected genre or category (step 2004). Active browsing component 28 proceeds to prioritize the matching media content, such as based upon length of time remaining in each media content, and instructs available media devices to tune into channels corresponding to higher prioritized media content (step 2006).

Then, active browsing component 28 obtains and optimizes the prioritized media content determined in step 2006 (step 2008) and displays one or more thumbnails 46 for the media content on an associated display device 12 (step 2010) in a manner similar to that described above with reference to passive browsing. In exemplary embodiments, active browsing component 28 may further display additional graphic indicators as described above with reference to passive browsing (step 2012). Once the thumbnails 46 have been displayed, a user may select a channel corresponding to a thumbnail 46 to watch or record or may continue browsing (step 2014).

In an exemplary embodiment, the navigation between thumbnails is performed with a "Wii-like" user interface device 32 or via standard arrows on a standard remote. When a thumbnail 46 or genre selector 64 is selected (or hovered over), audio for the associated media content may be played and the user has the option to play or record the media content. In an exemplary embodiment, a user may select a thumbnail 46 and choose "show others: by actor". In response, a list of actors on the current media content may be displayed. Selecting one of the actors initiates a new grouping. In accordance with other embodiments, alternative browsing methods may be provided. For example, a navigation means to select/browse media content by year of creation, such as 60's, 70's, or 80's, for example may be provided. In another embodiment, family members of a user may be listed across the bottom of a thumbnail 46. Selecting one of the family members may cause to be displayed content of interest to the user.

Figure 7:
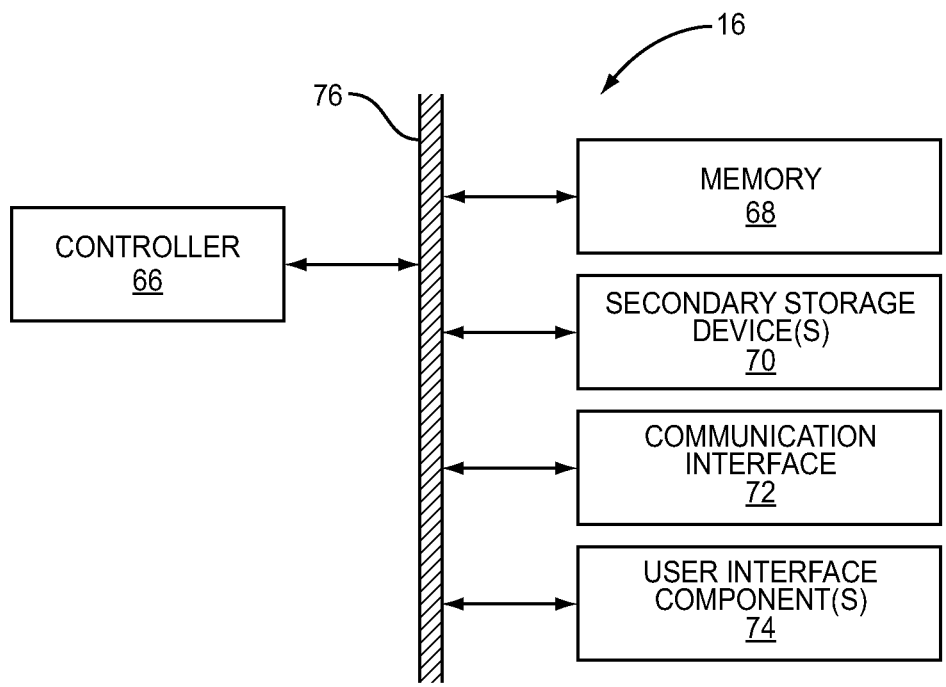
FIG. 7 is a diagram of a media device according to an exemplary embodiment.

FIG. 7 is a block diagram of a media device 16 of FIG. 1 according to one embodiment of the present disclosure. As illustrated, the media device 16 includes a controller 66 connected to memory 68, one or more secondary storage devices 70, a communication interface 72, and one or more user interface components 74 by a bus 76 or similar mechanism. The controller 66 is a microprocessor, digital ASIC, FPGA, or the like. In this embodiment, the controller 66 is a microprocessor, and software for performing the functions of media device 16 described above is stored in the memory 68 for execution by the controller 66. Further, depending on the particular embodiment, the various repositories 22, 26 are stored in the one or more secondary storage devices 70. The one or more secondary storage devices 70 are digital storage devices such as, for example, one or more hard disk drives. The communication interface 72 is a wired or wireless communication interface that communicatively couples the media device 16 to the network 18 (FIG. 1) as well as to external sources of media content including, but not limited to, cable and satellite signals. For example, the communication interface 72 may be an Ethernet interface, local wireless interface such as a wireless interface operating according to one of the suite of IEEE 802.11 standards, a mobile communications interface such as a cellular telecommunications interface, or the like.

Figure 8:
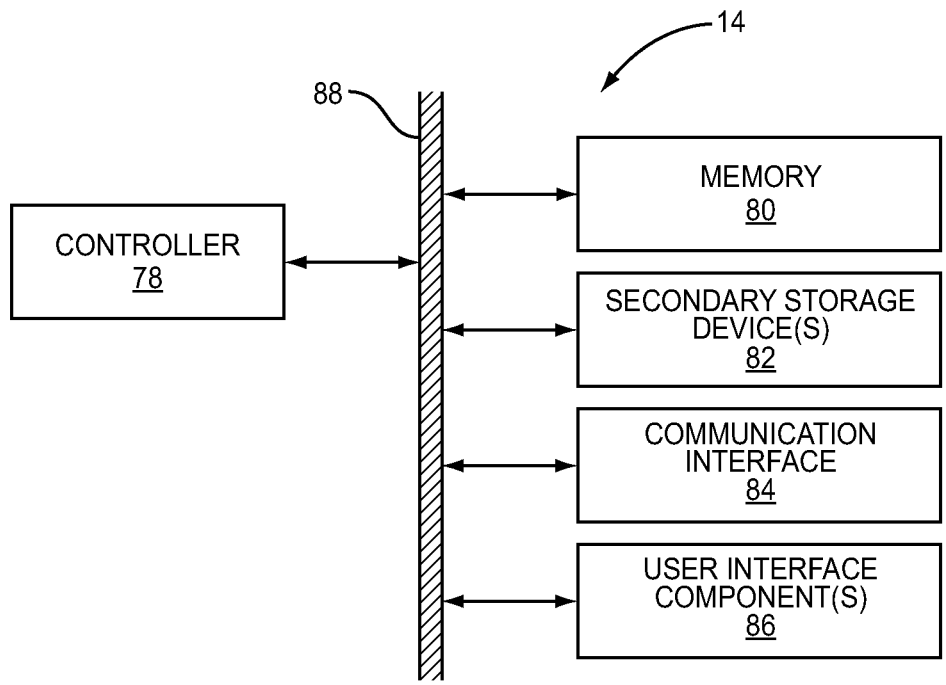
FIG. 8 is a diagram of a media server according to an exemplary embodiment.

FIG. 8 is a block diagram of a media server 14 of FIG. 1 according to one embodiment of the present disclosure. As illustrated, the media server 14 includes a controller 78 connected to memory 80, one or more secondary storage devices 82, a communication interface 84, and one or more user interface components 86 by a bus 88 or similar mechanism. The controller 78 is a microprocessor, digital ASIC, FPGA, or the like. In this embodiment, the controller 78 is a microprocessor, and software for performing the functions of media server 14 described above is stored in the memory 80 for execution by the controller 78. Further, depending on the particular embodiment, the various repositories 20, 22, 26 are stored in the one or more secondary storage devices 82. The one or more secondary storage devices 82 are digital storage devices such as, for example, one or more hard disk drives. The communication interface 84 is a wired or wireless communication interface that communicatively couples the media server 14 to the network 18 (FIG. 1) as well as to external sources of media content including, but not limited to, cable and satellite signals. For example, the communication interface 84 may be an Ethernet interface, local wireless interface such as a wireless interface operating according to one of the suite of IEEE 802.11 standards, a mobile communications interface such as a cellular telecommunications interface, or the like.

Those skilled in the art will recognize improvements and modifications to the preferred embodiments of the present invention. All such improvements and modifications are considered within the scope of the concepts disclosed herein and the claims that follow.

What is claimed is:
1. A media device comprising:
   a communication interface communicatively coupling the media device to one or more other media devices; and
   a controller comprising at least one processor and associated with the communication interface and adapted to:
   access one or more templates each comprising a layout of a graphical user interface (GUI) and at least one alert condition in response to a determination of a passive browsing mode;
   determine one or more other available device and a respective utilization of each of the one or more other available devices;
   identify the one or more other available media devices from which media content may be streamed and one or more media content streams being streamed from each of the one or more other available media devices;
   monitor for an occurrence of the at least one alert condition at a predetermined time interval;
   determine, based upon the occurrence of the at least one alert condition and the one or more media content streams being streamed, at least one of the media content streams being streamed to display;
   acquire the at least one of the media content streams for display in accordance with the one or more templates;
   output the at least one of the media content streams to a display for presentation in the GUI in accordance with the one or more templates;
   output an indication of the at least one alert condition for display in the GUI;
   output an indication to the display for presentation in the GUI of a degree to which the at least one of the media content streams being streamed matches one or more preferences in the one or more templates; and
   output at least one other indication to the display for presentation in the GUI of: a relevance to a particular segment of a show when the at least one of the media content streams is relevant to the particular segment of a show, a score alert in response to a score in a game matching the one or more preferences, and an end of game notice in response to a game nearing an end of a game matching the one or more preferences, the alert condition defining under what circumstances the at least one of the media content streams is displayed.

2. The media device of claim 1 wherein at least one of the one or more templates is a system template.

3. The media device of claim 1 wherein at least one of the one or more templates is personalized by a user.

4. The media device of claim 1 wherein the at least one alert condition defining when and how media content is to be displayed in the GUI.

5. The media device of claim 1 wherein the controller is adapted to output the indication of the at least one alert condition in response to identifying the occurrence of the at least one alert condition.

6. The media device of claim 1 wherein the controller is further adapted to identify the occurrence of the alert condition in response to a trigger.

7. The media device of claim 1 wherein the one or more media content streams available from each of the one or more other available media devices are identified via accessing an aggregated content guide comprising information describing the media content streams available from each of the one or other available more media devices.

8. The media device of claim 1 wherein the controller is further adapted to optimize the at least one of the media content streams for display.

9. The media device of claim 8 wherein the controller is further adapted to optimize the at least one of the media content streams for display based upon a characteristic of the one or more other available media devices from which the at least one of the media content streams are acquired.

10. The media device of claim 9 wherein the characteristic of the one or more other available media devices is selected from a group consisting of an availability of the one or more other media devices and a quality of the at least one of the media content streams.

11. The media device of claim 1 wherein the GUI comprises at least one thumbnail displaying at least one of the media content streams for display and a background.

12. The media device of claim 11 wherein the controller is further adapted to output one or more graphic indicators each associated with one of the at least one thumbnail.

13. The media device of claim 12 wherein one of the one or more graphic indicators comprises an indication of a match between the at least one of the media content streams displayed in the associated thumbnail and a user preference.

14. The media device of claim 13 wherein the user preference is stored in the one or more templates.

15. The media device of claim 12 wherein one of the one or more graphic indicators comprises an indication that the at least one of the media content streams displayed in the associated thumbnail is currently being displayed on a display associated with the one or more other available media devices.

16. The media device of claim 12 wherein one of the one or more graphic indicators comprises an indication that the at least one of the media content streams displayed in the associated thumbnail is currently streaming an advertisement.

17. The media device of claim 12 wherein one of the one or more graphic indicators comprises an icon that may be selected to provide more information related to the at least one of the media content streams displayed in the associated thumbnail.

18. The media device of claim 12 wherein one of the one or more graphic indicators comprises an indication of at least one of the score and the end of the game.

19. The media device of claim 1 wherein the media device is further adapted to optimize the at least one of the media content streams by replacing a portion of the at least one of the media content streams comprising an advertisement with a previously streamed portion of the at least one of the media content streams.

20. The media device of claim 1 wherein the media device is further adapted to optimize the at least one of the media content streams by:
   receiving repeatedly alternating first and second media content streams from one of the other available media devices;
   outputting the first media content stream to a first one of the at least one thumbnail; and outputting the second media content stream to a second one of the at least one thumbnail.

21. The media device of claim 20 wherein the first media content stream comprises a first image and the second media content stream comprises a second image.

22. The media device of claim 1 wherein the controller is further adapted to optimize the at least one of the media content streams by filtering the at least one of the media content streams based upon metadata associated with the at least one of the media content streams.

23. A non-transitory computer-readable medium embodied in an article of manufacture encoded with instructions for directing at least one processor of a media device to:
   access one or more templates each comprising a layout of a graphical user interface (GUI) and at least one alert condition in response to a determination of a passive browsing mode;
   determine one or more other available media devices and a respective utilization of each of the one or more other available media devices
   identify the one or more other available media devices from which media content may be streamed and one or more media content streams being streamed from each of the one or more other available media devices;
   monitor for an occurrence of the at least one alert condition at a predetermined time interval;
   determine, based upon the occurrence of the at least one alert condition and the one or more media content streams being streamed, at least one of the media content streams being streamed to display;
   acquire the at least one of the media content streams for display in accordance with the one or more templates;
   output the at least one of the media content streams to a display for presentation in the GUI in accordance with the one or more templates;
   output an indication of the at least one alert condition for display in the GUI;
   output an indication to the display for presentation in the GUI of a degree to which the at least one of the media content streams being streamed matches one or more preferences in the one or more templates; and
   output at least one other indication to the display for presentation in the GUI of: a relevance to a particular segment of a show when the at least one of the media content streams is relevant to the particular segment of a show, a score alert in response to a score in a game matching the one or more preferences, and an end of game notice in response to a game nearing an end of a game matching the one or more preferences, the alert condition defining under what circumstances the at least one of the media content streams is displayed.

24. The computer-readable medium of claim 23 wherein at least one of the one or more templates is a system template.

25. The computer-readable medium of claim 23 wherein at least one of the one or more templates is personalized by a user.

26. The computer-readable medium of claim 23 wherein the at least one alert condition defining when and how media content is to be displayed in the GUI.

27. The computer-readable medium of claim 23 wherein the controller is further adapted to: output an indication of the at least one alert condition for display in the GUI in response to identifying the occurrence of the at least one alert condition.

28. A method comprising:
   accessing one or more templates each comprising a layout of a graphical user interface (GUI) and at least one alert condition in response to a determination of a passive browsing mode;
   determine one or more other available media devices and a respective utilization of each of the one or more other available media devices;
   identifying the one or more other available media devices from which media content may be streamed and one or more media content streams being streamed from each of the one or more other available media devices;
   monitoring for an occurrence of the at least one alert condition at a predetermined time interval;
   determining, based upon the occurrence of the at least one alert condition and the one or more media content streams being streamed, at least one of the media content streams being streamed to display;
   acquiring the at least one of the media content streams for display in accordance with the one or more templates;

outputting the at least one of the media content streams to a display for presentation in the GUI in accordance with the one or more templates;

outputting an indication of the at least one alert condition for display in the GUI;

outputting an indication to the display for presentation in the GUI of a degree to which the at least one of the media content streams being streamed matches one or more preferences in the one or more templates; and outputting at least one other indication to the display for presentation in the GUI of: a relevance to a particular segment of a show when the at least one of the media content streams is relevant to the particular segment of a show, a score alert in response to a score in a game matching the one or more preferences, and an end of game notice in response to a game nearing an end of a game matching the one or more preferences, the alert condition defining under what circumstances the at least one of the media content streams is displayed.

29. The method of claim 28 wherein the at least one alert condition defines defining when and how media content is to be displayed in the GUI.

30. The method of claim 29 further comprising: determining the occurrence of the at least one alert condition.

* * * * *